(12) United States Patent
Iwanojko et al.

(10) Patent No.: US 6,901,580 B2
(45) Date of Patent: May 31, 2005

(54) CONFIGURATION PARAMETER SEQUENCING AND SEQUENCER

(75) Inventors: Bohdan T. Iwanojko, Gdansk (PL); Krzysztof S. Perycz, Chmielno (PL); Adam Kamiński, Gdansk (PL); Zbigniew Przekop, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 435 days.

(21) Appl. No.: 09/887,956

(22) Filed: Jun. 22, 2001

(65) Prior Publication Data

US 2002/0198967 A1 Dec. 26, 2002

(51) Int. Cl.[7] ............................................... G06F 9/44
(52) U.S. Cl. ..................... 717/121; 717/126; 709/220
(58) Field of Search ........................ 717/121–130, 717/168–171; 709/219, 220–226, 203, 228

(56) References Cited

U.S. PATENT DOCUMENTS 5,261,099 A * 11/1993 Bigo et al. ................. 709/102

| 5,794,231 A | 8/1998 | Li et al. |
| 6,008,805 A | 12/1999 | Land et al. |
| 6,128,656 A | 10/2000 | Matchefts et al. |
| 6,434,619 B1 * | 8/2002 | Lim et al. ............... 709/229 |
| 6,523,027 B1 * | 2/2003 | Underwood ............. 707/4 |

OTHER PUBLICATIONS

INTEL®, Intel® Media Switch, IXE2412 10/100 Device Product Brief, 2001, pp.—2.

INTEL®, Intel® Media Switch, IXE2412 10/100 Device Data Sheet, May 2000, pp.—32.

* cited by examiner

*Primary Examiner*—Tuan Dam
*Assistant Examiner*—Chuck Kendall
(74) *Attorney, Agent, or Firm*—Blakely, Sokoloff, Taylor & Zafman LLP

(57) ABSTRACT

The present invention is in the field of networking systems. More particularly, some embodiments change validation and setting of configuration parameter change requests within a transaction to provide a unified solution for software development.

28 Claims, 7 Drawing Sheets

CONFIGURATION PARAMETER SEQUENCING AND SEQUENCER

FIELD OF INVENTION

The present invention is in the field of networking systems. More particularly, the present invention provides a method, apparatus, system, and machine-readable medium to sequence configuration parameters.

BACKGROUND

Devices in a network comprising an embedded system often referred to as nodes, such as routing, bridging, switching, porting, and multifunction devices, can determine the behavior of a network. The behavior of the nodes may be determined by embedded system software and the behavior of the software can be based on specific functions. A module may comprise circuitry such as a microprocessor to execute embedded software to perform a specific function and the performance can be governed by configuration parameters of the module. Further, the behavior of a first module can be affected by a configuration parameter of a second module when the first module has a configuration parameter dependent on the second module's configuration parameter.

Since the behavior of the network may be governed by configuration parameters, a system for updating configuration parameters can provide flexibility. For example, data transmission functions or protocols may be turned on, off, or modified. The configuration parameters may reside in run-time variables of a module as well as a configuration database. Inconsistent configuration parameters, however, can disrupt a module's operation, causing time delays or lost sessions, so changes to configuration parameters should be made in a correct sequence.

Configuration parameter change requests may be transmitted to one or more management clients and the management clients may forward the requests to modules in different sequences so modules may not receive configuration parameters in a correct sequence. A correct sequence for configuration parameters requests can comprise a sequence that maintains inter-module dependencies of configuration parameters, sometimes referred to as maintaining the global consistency. Thus, to maintain the global consistency, reconfiguration of a module may comprise the shutdown and initialization of the node with the new configuration parameters or each module must support receipt of requests in an incorrect sequence, reducing network capabilities for a period of time and increasing the size and complexity of each module's administration code.

BRIEF FIGURE DESCRIPTIONS

The accompanying drawings, in which like references indicate similar elements, show:

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Figure 1:
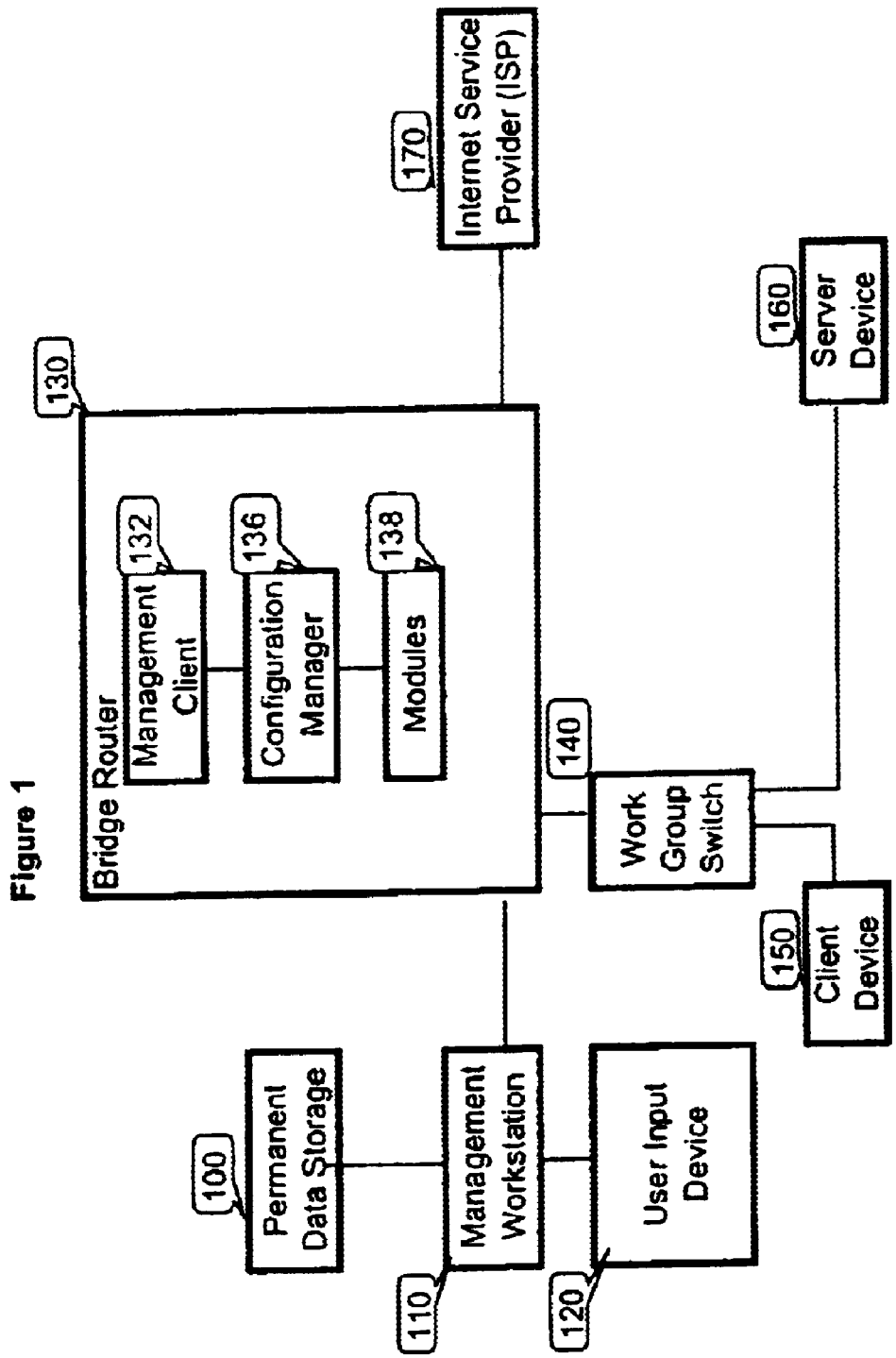
FIG. 1 depicts a network coupled to an Internet service provider (ISP).

Referring now to FIG. 1, there is shown an example embodiment of a local-area network (LAN) coupled to an Internet service provider (ISP) 170. The LAN comprises a bridge router 130 to route interactions between a local work area and ISP 170. The LAN comprises a work group switch 140 to couple stations, client device 150 and server device 160, to the ISP 170 and to facilitate interactions between the stations.

The ISP 170 may be coupled to bridge router 130 via a digital subscriber line (DSL). The DSL interface with ISP 170 may route configuration requests from bridge router 130 to ISP 170 at speeds of 64 kilobits per second (Kbps). Further, the connection may route these requests from ISP 170 to bridge router 130 at speeds of 1.5 megabits per second (Mbps).

The work group switch 140 may be configured for 10 Mbps by 100 Mbps (10/100 Mbps) port-to-port switching and may comprise a trunk configured for 100 Mbps transactions. The trunk may couple work group switch 140 to bridge router 130 and the work group switch 140 may comprise ports coupled to client device 150 and server device 160.

The bridge router 130 may comprise a port such as an asynchronous transfer mode (ATM) controller accompanied by driver software to accept and receive configuration requests via the DSL and may be coupled to a management workstation 110 to allow a user to change configuration parameters of the bridge router 130 via a graphical user interface (GUI). The management workstation 110 may assist user parameter configuration via user input device 120 and may be coupled to permanent data storage 100. The permanent data storage may provide a user with configuration parameters of bridge router 130 for use with the GUI and management workstation 110 and can be consistent with the contents of run-time variables in modules of the bridge router 130.

When the DSL service is upgraded to facilitate configuration requests from bridge router 130 to ISP 170 at speeds of 1.5 Mbps, the configuration parameters in the modules 138, a handshake protocol module, router protocol module, and bridging module, of bridge router 130 may be reconfigured to the new DSL interface. A set of configuration parameter change requests may comprise three interdependent configuration parameter change requests in a single transaction from a user via the GUI of management workstation 110. Each request may initiate a configuration parameter change. The configuration parameter change requests may comprise three parameters to change to take advantage of the new DSL interface with minimal impact on the operation of the LAN. The first parameter may comprise initiating a handshake protocol of a module for interactions to and from ISP 170. The second parameter may comprise initiating a routing protocol of a module for packets to and from the workgroup switch 140. Finally, the third parameter may comprise initiating a bridging protocol of a module for bridging packets to/from the LAN format from/to the DSL format.

The management workstation 110 may forward the three configuration parameter change requests as a single, atomic transaction to bridge router 130 via a simple network management protocol (SNMP) interface. The management client 132 in bridge router 130 may receive the configuration parameter change requests and forward the requests to the configuration manager 136. The configuration manager 136 may then checkset the configuration parameter change requests to determine whether the three configuration parameter changes are valid and whether setting the values for the configuration parameters in the order received will maintain global consistency.

Configuration manager 136 may forward the first parameter to a module to be validated. The module may return a response to the configuration manager 136 indicating that the parameter is either invalid or out of sequence since initiating a handshake protocol for the DSL may cause the protocol module to indicate that the bridge router 130 is ready to handle interactions. Configuration manager 136 may then store a reference to the first parameter in a queue to facilitate determining a corrected sequence for configuration parameter change requests.

The second parameter may then be forwarded for validation and the module may return a response indicating that the second set of parameters is either invalid or out of sequence. The first and second parameter may have been rejected as out of sequence because the new bridging procedure needs to be in effect before the packets can be transferred between the LAN and the ISP 170.

When forwarded to the module for validation, the third parameter may be determined to be valid. With a valid indication for the configuration parameter change request for the third parameter, the configuration manager 136 may forward the first and second parameter to the modules 138 for validation. During the second pass for validation of first and second parameters, the modules 138 accept the first and second parameters as valid since the bridging module is available. In some embodiments, the first and second parameters may be forwarded to modules 138 simultaneously or substantially simultaneously to be validated.

Once the configuration parameter change requests are checkset, the configuration parameter change requests can be executed. The corrected sequence for the configuration parameter change requests can comprise the third parameter, first parameter, and second parameter, respectively, since the modules 138 validated the parameters in that order. The parameters may be forwarded to the modules 138 to be stored in run-time variables.

Figure 2:
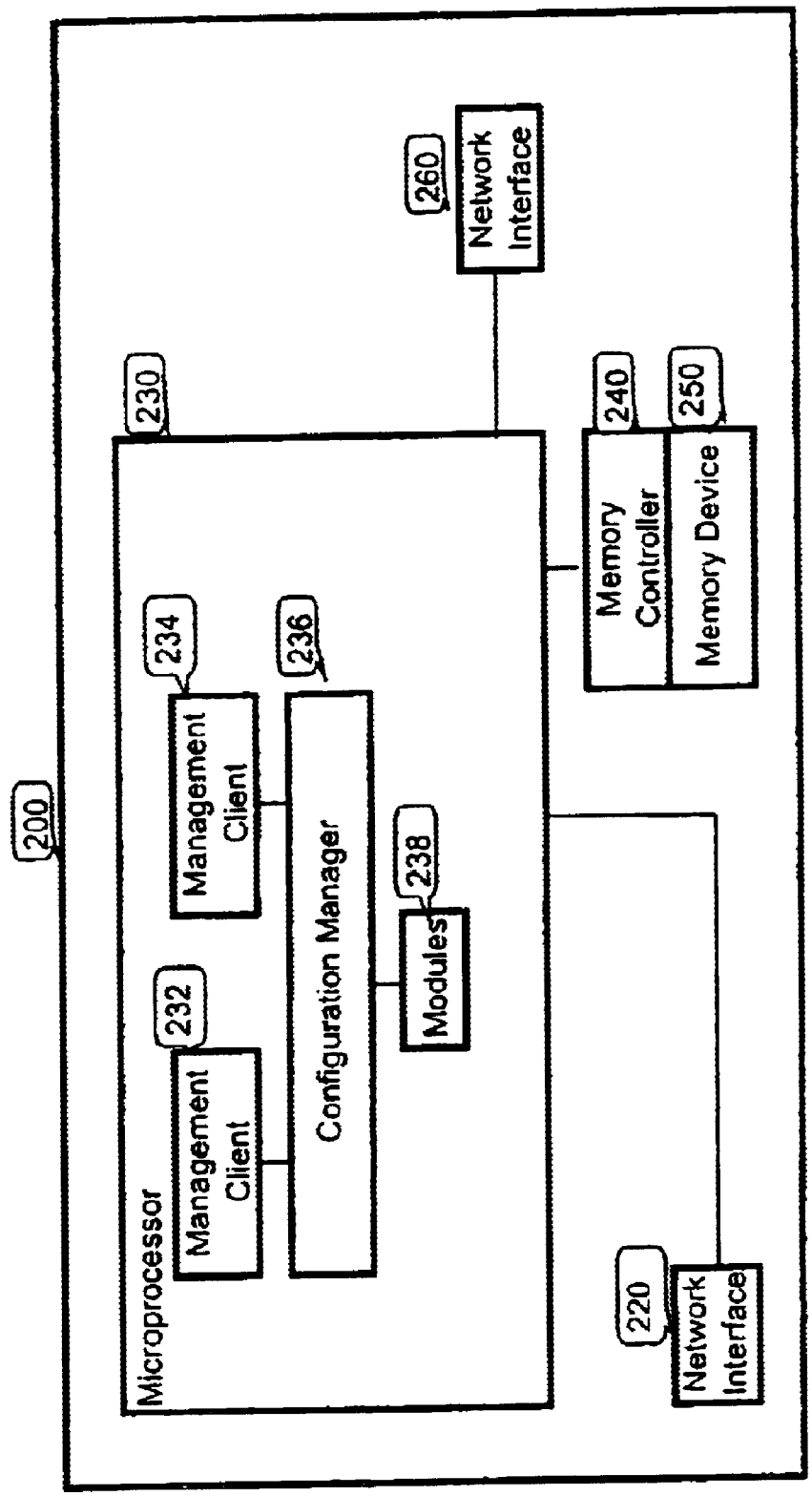
FIG. 2 depicts a node capable of checksetting and executing a configuration parameter change requests within one transaction.

Referring now to FIG. 2, a node 200 is shown. Node 200 may comprise a network interface 210, a microprocessor 230, a memory controller 240, a memory device 250, and a network interface 260. Node 200 may receive packets via network interface 210 and microprocessor 230 can distribute the packets to the intended destination workstations coupled to network interface 260 via filtering and/or switching modules 238.

Microprocessor 230 can be coupled to memory device 250 via memory controller 240 and may store code and data to facilitate distribution of configuration parameters between interfaces. Memory device 250 may comprise random access memory (RAM) to store modules and a corrected configuration parameter sequence table and may comprise a queue to store IP addresses for connected workstations. In addition, memory device 250 may comprise nonvolatile memory to store media access controller (MAC) driver software, dynamic host control protocol (DHCP) software, and transmission control protocol/internet protocol (TCP/IP) software, management client software, and configuration manager software. The network interface 210 may be connected to a device having a static IP address but to add flexibility to the number and location of workstations connected to the node 200, DHCP may select an IP address for a workstation as it becomes active.

A software module may arbitrate configuration parameter change requests passed from workstations to network interface 210 and configuration parameters of the software module may indicate the number and priority levels of workstations connected to the node 200. For example, node 200 may have a workstation with a guaranteed minimum access speed of 50 Mbps to a device coupled to network interface 210 whereas other workstations coupled to node 200 can receive equivalent fractions of available access speed to network interface 210. When network interface 210 has a transmission speed of 100 Mbps and the high priority workstation consumes 50 Mbps of the data transmission speed, the two remaining workstations may share 50 Mbps access speed. Thus, when one of the remaining two workstations is not actively transmitting packets via node 200 the other workstation may consume up to 50 Mbps access speed.

The user may turn on the third workstation and begin to actively access a device coupled to network interface 210 via node 200. When DHCP software in the third workstation is activated microprocessor 230 may assign a temporary IP address to the third workstation and store the IP address in the queue. For the third workstation to access the LAN, management client 232 can create a port and management client 234 can set the speed of the port with a set of configuration parameter change requests within a transaction. The management clients, software executed by microprocessor 230 in this embodiment, may transmit the configuration parameter change requests to the configuration manager 236. The configuration manager 236, also software executed by the microprocessor 230 in this embodiment, can checkset and execute the configuration parameter change requests. First, the configuration manager 236 may forward each request to the modules 238 to be validated. The first request forwarded to the arbitration module may be the change in speed for the third workstation, however, the first request may depend upon the creation of the port so the arbitration module may respond with a repeat call status. The arbitration module may validate the second request and then the configuration manager may retransmit the first request. The arbitration module can accept the first request after the second request.

A corrected sequence of the configuration parameter change requests may be determined during validation. For instance, when the first configuration parameter change request is a change in speed for workstation 3 and the second configuration parameter change request is the creation of a port for workstation 3, the configuration manager 236 can receive a repeat call status for the first request during the first pass of validation. Since the first configuration parameter change request receives a repeat call status during validation, a reference to first request can be stored in the corrected sequence table in RAM in the memory device 250. Once the remaining requests can be validated, the configuration manager 236 may forward the first request to the modules 238 for validation. When the modules 238 return a valid status in response to the first request, all the configuration parameter change requests within the transaction have been validated. Thus, the corrected sequence for configuration parameter change requests within the transaction may be the second request then the first request.

Once the configuration parameter change requests within the transaction have been checkset, the configuration manager 236 can execute the configuration parameter change requests. The configuration manager 236 may forward the configuration parameter change requests in the corrected sequence.

Under alternative circumstances, more than one pass may be required to checkset the configuration parameter change requests within a transaction. For example, configuration manager 236 may checkset a set of configuration parameter change requests comprising three configuration parameter change requests, request 1, request 2, and request 3. During the first pass of checksetting, request 1 may be rejected and a reference to request 1 may be stored in the first location of the corrected parameter sequence table. Then request 2 may be rejected and stored in the second location in the corrected parameter sequence table and, finally, request 3 may be accepted. During pass 2, request 1 may be rejected again but request 2 may be accepted. A reference to request 1 may be stored in a second location in the corrected parameter sequence table in a second table, or moved from the first location to the third location in the corrected parameter sequence table. Request 1 may be passed to the modules 238 to be checked in a third pass. During the third pass, when request 1 is validated, a corrected sequence for the configuration parameter change requests within the transaction may be determined. On the other hand, when request 1 is rejected again, no requests in the third pass are accepted as valid, so all the configuration parameter change requests within the transaction may be invalidated.

When one configuration parameter change request cannot be validated, the configuration manager 236 may return a status to the corresponding management client indicating that the configuration parameter change requests may be invalid and the management client may return a similar indication to the requester. The configuration manager 236 may also delete references in the corrected parameter sequence table.

In alternative embodiments, a corrected parameter sequence table may comprise the configuration parameters that received the repeat call rather than references to those parameters or requests. Further embodiments may comprise more or less modules and different combinations of interfaces.

Figure 3:
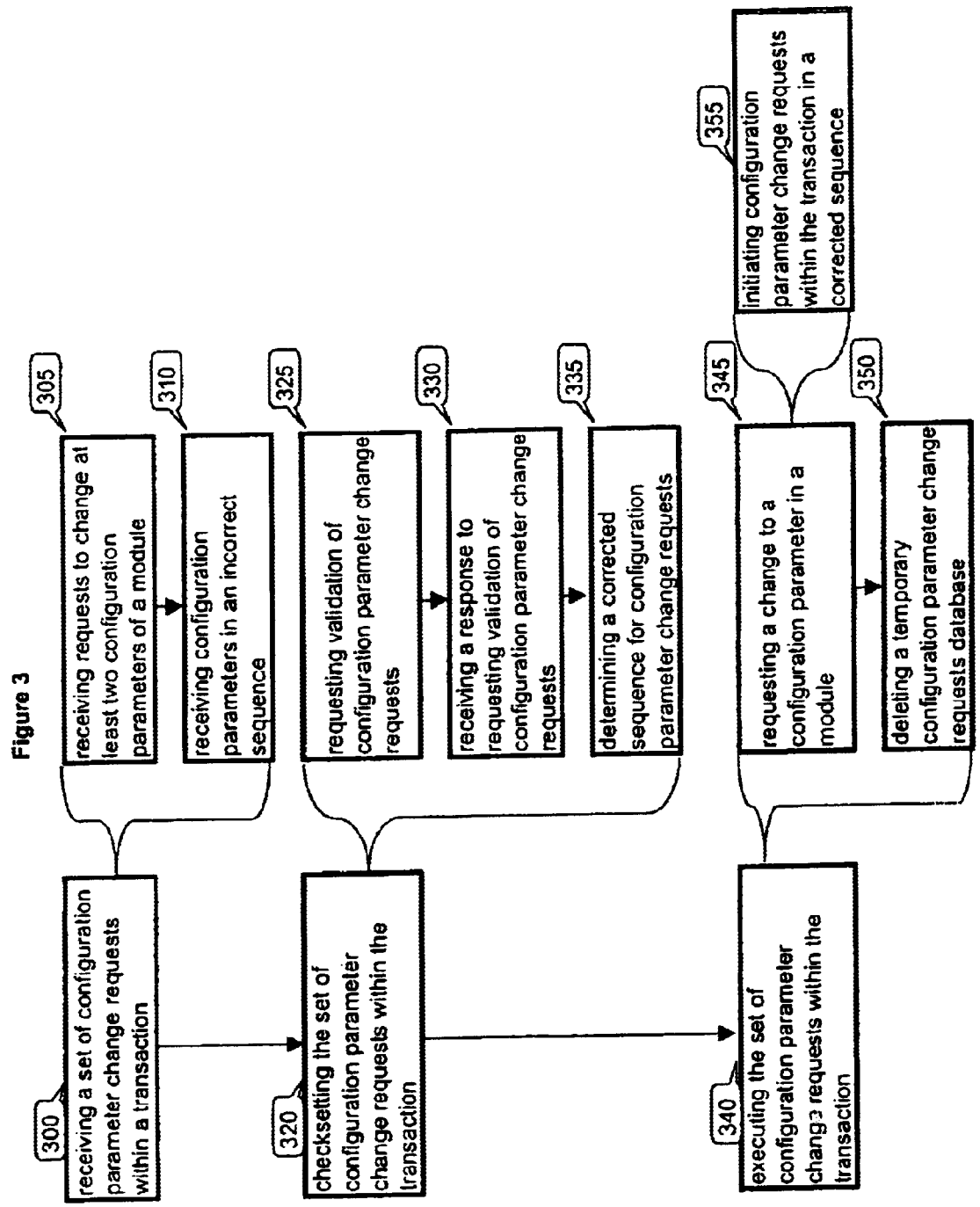
FIG. 3 depicts a flow chart to change a configuration parameter.

Referring now to FIG. 3, there is shown a flowchart to change a configuration parameter. The flowchart comprises receiving a set of configuration parameter change requests within a transaction 300, checksetting the set of configuration parameter change requests within the transaction 320, and executing the set of configuration parameter change requests within the transaction 340. Receiving a set of configuration parameter change requests within a transaction 300 may receive a request from one or more management clients and the sequence of the parameter changes may depend on a management client. Regardless of the source of the configuration parameter changes, the configuration parameter change requests may be in an incorrect sequence for the intended run-time module(s). A correct sequence of parameter changes of a run-time module may depend upon inter-module dependencies between that module and other modules in the node. In some embodiments, the number and type of modules may be modified to meet changing requirements of a network. Receiving a set of configuration parameter change requests within a transaction 300 can comprise receiving requests to change at least two configuration parameters of a module 305 and receiving configuration parameters in an incorrect sequence 310.

Receiving requests to change at least two configuration parameters of a module 305 may comprise receiving a request to change configuration parameters from a local or remote management station. The management station may comprise a transaction protocol module such as a simple network management protocol (SNMP) module. A device with an SNMP module may comprise a management information base (MIB). The MIB may comprise objects that can be monitored by a network management system, such as a management workstation, comprising SNMP. Using standardized MIB formats may allow SNMP communication tools to monitor any device defined by a MIB. Thus, a SNMP requester may request information of another SNMP device and that device may return one or more protocol data units (PDU's) containing the information requested. PDU's can be messages designed for SNMP communication.

The speed that PDU's are sent and received and the size of each PDU can be determined by the management protocol. When a device on the network requests a different size PDU or a PDU to be transmitted and received at a different speed, new configuration parameters may be forwarded to the node or nodes between a requester and target agent on the network in an atomic transaction, i.e. a transaction that may fail unless every request within the transaction is performed.

Receiving configuration parameters in incorrect sequence 310 may receive a request to change the speed of transmission of PDU's from a SNMP requester or other requester of more than one configuration parameter change request for a module(s) comprising inter-module dependencies of modules within the node. The module may be unable to effect the configuration parameter changes because the changes can introduce inconsistencies between configuration parameters.

Checksetting the set of configuration parameter change requests within the transaction 320 may confirm the validity of more than one configuration parameter request, determine a correct sequence for the requests in a set of configuration parameter requests, or invalidate the transaction. Checksetting the set of configuration parameter change requests within the transaction 320 can comprise requesting validation of configuration parameter change requests 325, receiving a response to requesting validation of configuration parameter change requests 330, and determining a corrected sequence for configuration parameter change requests 335. Requesting validation of configuration parameter change requests 325 may forward each parameter of configuration parameter change requests within a transaction to a module with instructions for the module to validate each configuration parameter change. In some embodiments, requesting validation of configuration parameter change requests 325 may comprise forwarding a configuration parameter change request to an intended module(s) in the order received.

Receiving a response to requesting validation of configuration parameter change requests 330 may comprise receiving a repeat call status. A repeat call status may indicate that the request may be in an incorrect sequence for the configuration parameter change requests of the transaction or may indicate that configuration parameter change requests of the transaction may be invalid. In some embodiments, receiving a response to requesting validation of configuration parameter change requests 330 can comprise receiving a response indicating the request is valid in the order received.

Determining a corrected sequence for configuration parameter change requests 335 may store a reference to a request, upon receiving a repeat call for that request, into a corrected parameter sequence queue. In some embodiments, determining a corrected sequence for configuration parameter change requests 335 may comprise storing an indication of requests received in a correct order. More than one correct order may be possible depending upon the dependencies of the configuration parameters within the module and in other modules. For example, when parameter 1 and parameter 2 are not dependent upon each other and parameter 1 and parameter 2 do not affect interdependences between modules within the node then parameter 1 and parameter 2 may be changed in any order.

Executing the set of configuration parameter change requests within the transaction 340 may request a module to make changes to run-time variables. Executing the set of configuration parameter change requests within the transaction 340 can comprise requesting a change to a configuration parameter in a module 345 and deleting a temporary configuration parameter change requests database 350. Requesting a change to a configuration parameter in a module 345 may change configuration parameters in a module according to the requests of the configuration parameter change requests within the transaction by instructing the module to update run-time variables. Requesting a change to a configuration parameter in a module 345 can comprise initiating configuration parameter change requests within the transaction in a corrected sequence 355.

Initiating configuration parameter change requests within the transaction in a corrected sequence 355 may forward configuration parameters in a sequence based upon a corrected parameter sequence queue to an appropriate module(s). A corrected sequence queue may comprise references to configuration parameter change requests within a transaction that were in an incorrect sequence, requests within the transaction that are in a correct sequence, or both. In some embodiments, the corrected parameter sequence queue may comprise copies of the configuration parameters or requests in a corrected sequence or copies of configuration parameters or requests in an incorrect sequence.

Deleting a temporary configuration parameter change requests database 350 may delete a database such as the corrected parameter sequence queue or another temporary database upon validating or invalidating the configuration parameter change requests within the transaction. For example, upon checksetting the set of configuration parameter change requests within the transaction 320, the configuration parameter change requests within the transaction may be invalidated and a temporary database used to try to determine a corrected sequence for the configuration parameter change requests within the transaction may be deleted prior to making any changes to the run-time variables in a module. In some embodiments, the temporary configuration parameter change requests database may not be deleted but the data within that database may be invalidated. Invalidating data within the database may comprise changing a bit.

In some embodiments of the invention, executing the set of configuration parameter change requests within the transaction 340 can comprise storing the changed configuration parameters in a configuration parameter database after storing the configuration parameters in run-time variables in the module. In many embodiments of the invention, executing the set of configuration parameter change requests within the transaction 340 can comprise rejecting configuration parameter change requests. Rejecting configuration parameter change requests may respond to a requester upon determining a set of configuration parameter change requests is invalid.

Figure 4:
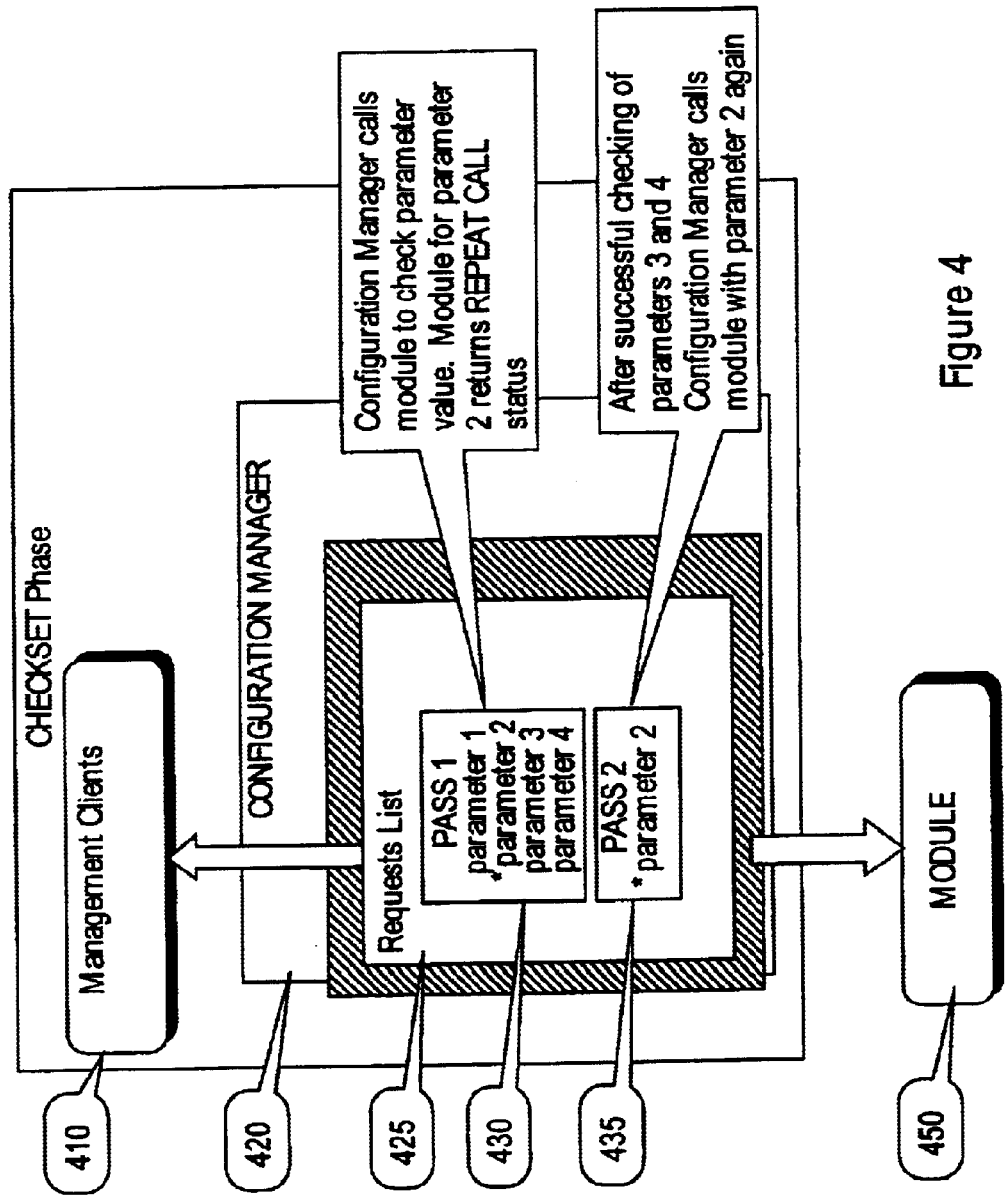
FIGS. 4–6 depicts before-and-after examples of checksetting configuration parameter requests.

Referring now to FIG. 4, there is shown an example of checksetting the set of configuration parameter change requests within the transaction. The figure comprises interaction between management clients 410, configuration manager 420, and module 450. The configuration manager 420 may comprise a requests list 425 comprising one or more temporary configuration parameter change request databases such as a pass 1 corrected parameter sequence queue 430, and a pass 2 corrected parameter sequence queue 435. The order of configuration parameters shown in the pass 1 corrected parameter sequence queue 430 may be the order of the original configuration parameter change requests within the transaction from management clients 410. When each parameter, parameter 1, parameter 2, parameter 3, and parameter 4, are passed to a module(s) for validation the module(s) returns a repeat call status for parameter 2, indicated by the asterisk next to parameter 2. Parameter 2, or a reference thereto, may be copied into a pass 2 corrected parameter sequence queue 435 and can be forwarded to the module(s) after parameter 4 is validated. When parameter 2 is passed to the module(s) the second time and a repeat call is not received from the module(s), the corrected sequence for the configuration parameter request transaction may be determined. A corrected sequence for the configuration parameter requests within the transaction can be parameter 1, parameter 3, parameter 4, and then parameter 2.

While executing the configuration parameter change requests within the transaction, the configuration manager may forward the configuration parameter change requests in the corrected sequence determined while checksetting the set of configuration parameter change requests. In FIG. 4, the corrected sequence can comprise the passing parameter 1, parameter 3, parameter 4, and then parameter 2. Since more than one sequence may be correct, some embodiments may determine a different corrected sequence such as 4,3,1 and 2; 3,1,4, and 2; . . . that maintains the global consistency.

Figure 5:
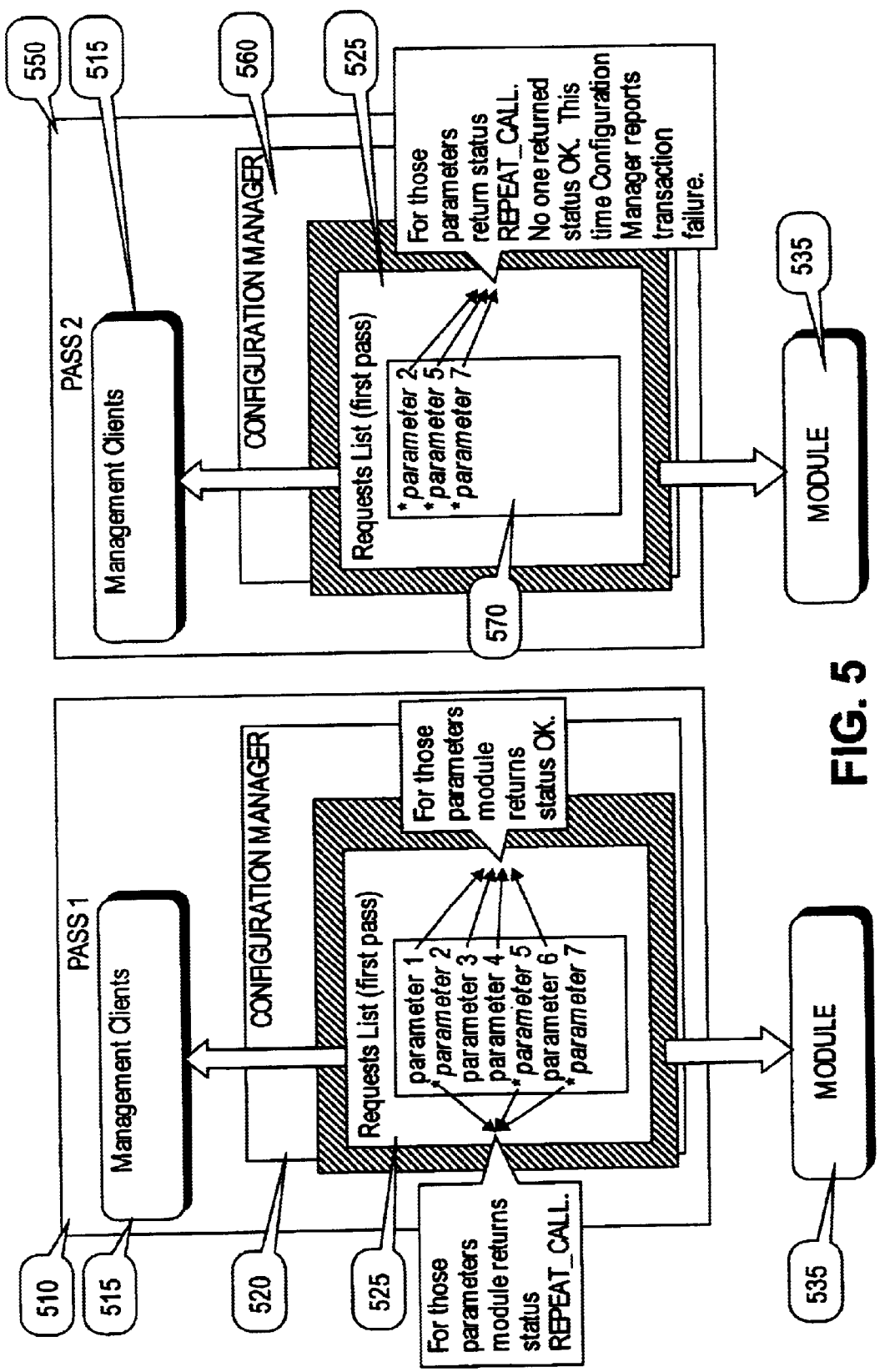

Referring now to FIG. 5, there is shown an example of configuration parameter change requests within a transaction invalidated while checksetting the configuration parameter change requests within the transaction. FIG. 5 shows a time frame called pass 1 510 that comprises a time from receipt of the configuration parameter change requests within the transaction through forwarding all the requests to the module 535 once. The configuration manager 520 receives the configuration parameter change requests from management clients 515 and stores the requests in a requests list queue 525 in the order the configuration parameters are received. Configuration parameters 1 through 7 represent seven requests and are forwarded to the module 535. A repeat call status is received for parameter 2, parameter 5, and parameter 7. Parameters 2, 5 and 7 can be stored in a second temporary configuration parameter change requests database 570 and may be forwarded to the module 535 in order during the pass 2 time frame. When the module 535 returns a repeat call for all the parameters in pass 2 550, a corrected configuration parameter requests sequence may not be determined. When a corrected sequence for a configuration parameter change request may not be determined, the entire transaction may be invalidated and a status invalidating the entire set of configuration parameter change requests within the transaction may be transmitted to the management clients 515. Changing some of the configuration parameters in response to the transaction such as parameter 1, parameter 3, parameter 4, and parameter 6 but not parameters 2, 5 and 7 may not accomplish the change that the management clients 515 requested and may introduce inconsistencies into the configuration of the module 535 and between that module 535 and other module(s).

Figure 6:
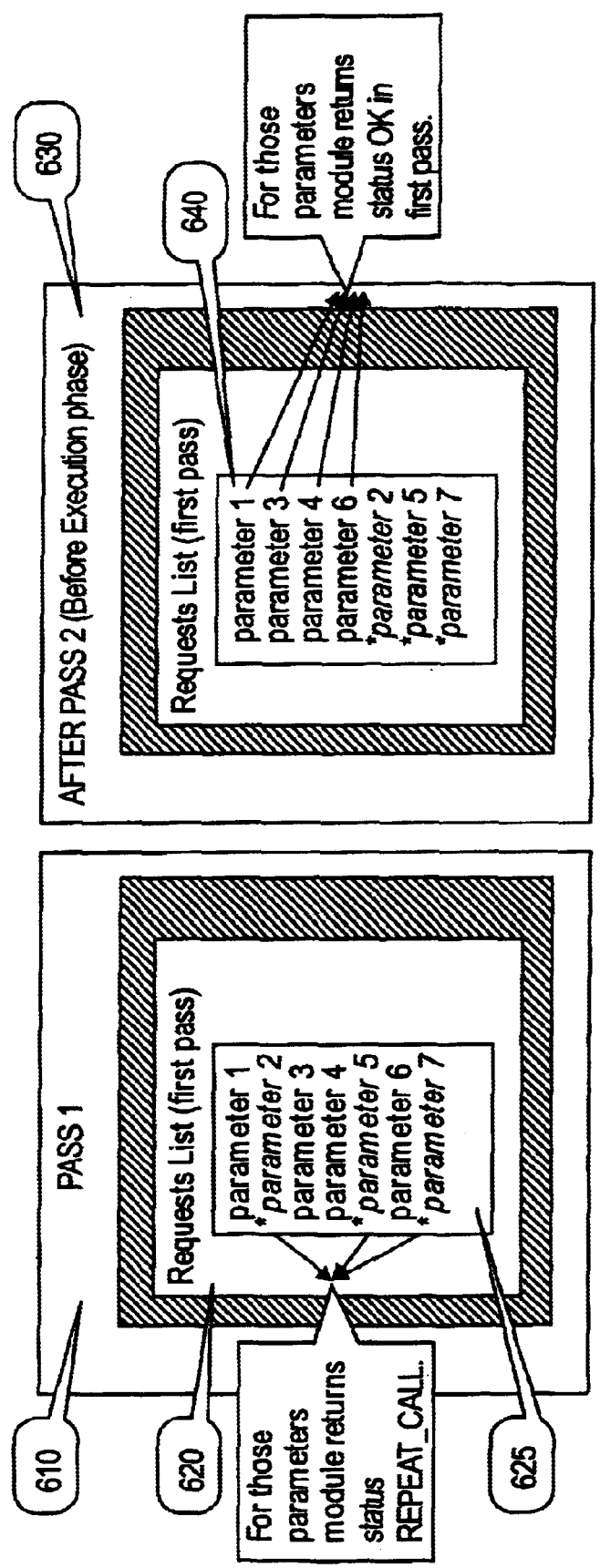

Referring now to FIG. 6 there is shown an example of determining a corrected sequence for configuration parameter change requests within the transaction. Pass 1 610 may comprise forwarding configuration parameter change requests to a module and receiving status from the module for parameters 2, 5 and 7 as being out of sequence. The request list 620 comprises a queue 625 having configuration parameters of requests in the order received in the transaction. After parameters 2, 5 and 7 are validated by the module in a second pass, after pass 2 630, a corrected sequence for the configuration parameter change requests within the transaction may be determined and stored in a corrected parameter sequence queue 640. Since all the parameters can be validated by the end of the second pass, the corrected sequence for the set of configuration parameter change requests within the transaction may be the parameters that were validated in pass 1 followed by the parameters that received a repeat call status in pass 1 in the order they were forwarded to the module(s).

From the corrected sequence for the configuration parameter change requests within the transaction, the request comprising parameter 2 has been determined to have a dependency upon parameter 3, parameter 4, or parameter 6. The dependency may be that parameter 3, 4 or 6 indicates a range within which parameter 2 must fall. The parameters that must be set before parameter 2 may affect an intermodule dependency. Further, it may be determined that the request comprising parameter 5 must have an interdependency with parameter 2 or parameter 6 and the request comprising parameter 7 may be dependent on parameters 2 or 5.

In alternative embodiments, more than two passes may be required to determine the corrected sequence. For instance, when during pass 2, a repeat call is generated in response to parameter 5 but not in response to parameters 2 and 7, a third pass may verify the request comprising configuration parameter 5. During the third pass, when configuration parameter 5 is validated, the corrected sequence for the configuration parameter requests of the transaction would be parameter 1, parameter 3, parameter 4, parameter 6, parameter 2, parameter 7, and then parameter 5. However, during the third pass, when a repeat call is received in response to parameter 5 and parameter 5 is the only parameter in the third pass, the configuration parameter change requests of the transaction may be invalidated.

Figure 7:
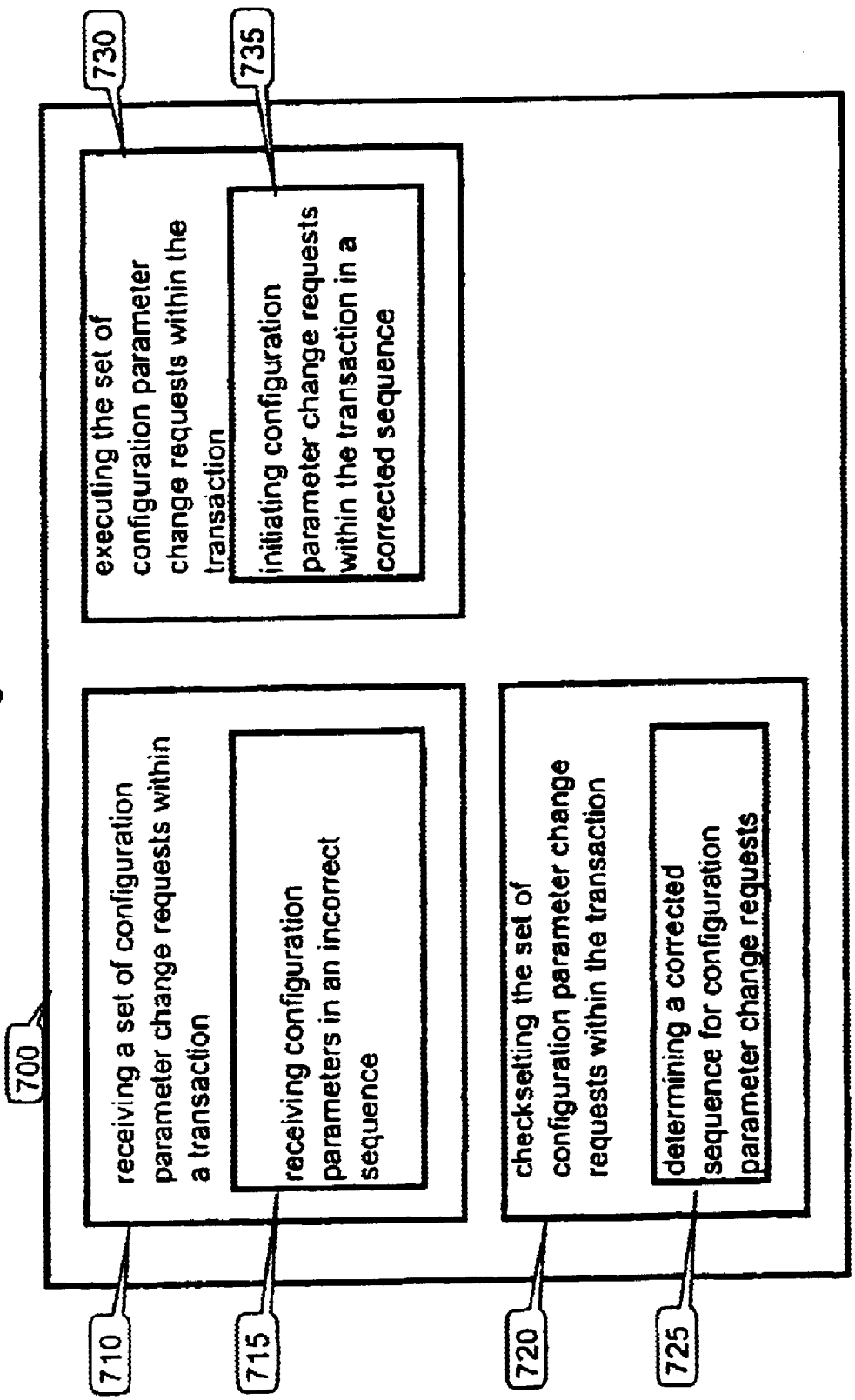
FIG. 7 depicts a machine-readable medium comprising instructions to change a configuration parameter.

Referring now to FIG. 7, a machine-readable medium embodiment of the present invention is shown. A machine-readable medium includes any mechanism that provides (i.e. stores and or transmits) information in a form readable by a machine (e.g., a computer), that when executed by the machine, can perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc . . . Several embodiments of the present invention can comprise more than one machine-readable medium depending on the design of the machine.

The embodiment 700 comprises instructions for receiving a set of configuration parameter change requests within a transaction 710, checksetting the set of configuration parameter change requests within the transaction 720, and executing the set of configuration parameter change requests within the transaction 730. Receiving a set of configuration parameter change requests within a transaction 710 may comprise receiving configuration parameters in an incorrect sequence 715. Receiving configuration parameters in an incorrect sequence 715 may comprise instructions to handle receiving configuration parameter change requests within a transaction from any of a number of management clients that do not sort the configuration parameter requests in an order dependent upon the interdependencies of the configuration parameters in the module(s). For example, a set of configuration parameter change requests may comprise requests to change two configuration parameters, parameter 1 and parameter 2, in that order. Parameter 1 may be dependent upon parameter 2 and if parameter 1 was set prior to changing the value of parameter 2, the configuration parameters of the module(s) may be inconsistent. Inconsistent parameters within a module or between modules can cause delays in transactions, failures of transactions, and rejections of valid transactions.

Checksetting the set of configuration parameter change requests within the transaction 720 may comprise instructions for determining a corrected sequence for configuration parameter change requests 725, or invalidating the configuration parameter change request. Determining a corrected sequence for configuration parameter change requests 725 may comprise instructions to sort the requests within a transaction in an order in accordance to dependencies of configuration parameters in the module(s). Several embodiments comprise instructions to determine a corrected sequence for the configuration parameter change requests while validating requests with the module(s). In some embodiments, determining a corrected sequence for configuration parameter change requests 725 may involve instructions for storing a reference to a request in a corrected parameter sequence queue or in another temporary configuration parameter change requests database.

Executing the set of configuration parameter change requests within the transaction 730 may comprise instructions for requesting a change of a configuration parameter of a module. Changing a configuration parameter of a module may store a new configuration parameter in a run-time variable. Executing the set of configuration parameter change requests within the transaction 730 can comprise initiating configuration parameter change requests within the transaction in a corrected sequence 735.

Initiating configuration parameter change requests within the transaction in a corrected sequence 735 can comprise instructions for reordering requests of a transaction into a sequence described in a corrected sequence table. The corrected sequence table may comprise more than one corrected parameter sequence queue indicating configuration parameters or requests received in an incorrect sequence. In some embodiments, each corrected parameter sequence queue may comprise copies of the parameters or requests received in an incorrect sequence.

In alternative embodiments, the corrected parameter sequence queue may comprise indications of requests received in a correct sequence. In still further embodiments, a corrected sequence queue may comprise copies of configuration parameters or requests received in a correct sequence. In alternative embodiments, a corrected parameter sequence queue may comprise references to all the configuration parameters or requests of a transaction in a corrected sequence or copies of all the parameters or requests of a transaction in a corrected sequence. In many embodiments of the invention, executing the set of configuration parameter change requests within the transaction 730 can comprise instructions for rejecting configuration parameter change requests. Rejecting configuration parameter change requests may comprise instructions to respond to a requester with an indication of invalidity of a transaction.

What is claimed is:

1. A device, comprising:
    a port to receive a set of configuration parameter change requests within a transaction; and
    a configuration manager coupled to said port to determine a corrected sequence for the configuration parameter change requests within the transaction via validation of a change request within the transaction by a module and coupled to the module to execute the set of configuration parameter change requests in the corrected sequence.

2. The device of claim 1, further comprising a management client module to bridge the change request from said port to said configuration manager.

3. The device of claim 1, further comprising a temporary configuration parameter change requests database coupled to said configuration manager to store data to determine the corrected sequence for the transaction.

4. The device of claim 1, wherein the module comprises circuitry coupled to said configuration manager to respond to a request for validation of the change request with a repeat call.

5. The device of claim 1, wherein the module comprises circuitry of a microprocessor coupled to said configuration manager and having a configuration parameter subject to the transaction to function as a run-time variable.

6. The device of claim 1, wherein the module comprises circuitry to receive the transaction coupled to circuitry to forward the transaction to said configuration manager.

7. The device of claim 6, wherein the circuitry to receive the transaction comprises a network management protocol module.

8. The device of claim 1, wherein said configuration manager comprises circuitry coupled to the module to request validation of the change request by the module.

9. The device of claim 1, wherein said configuration manager comprises circuitry coupled to the module to determine the corrected sequence for the change request within the transaction wherein the corrected sequence is based upon a response from the module.

10. The device of claim 9, the circuitry coupled to the module to determine a corrected sequence comprises circuitry coupled to the module to receive the response and coupled to a temporary configuration parameter change requests database to associate the response with the change request.

11. The device of claim 1, said configuration manager comprises circuitry coupled to the module to execute the set of configuration parameter change requests based upon the corrected sequence for the transaction.

12. The device of claim 11, wherein the circuitry to execute the set of configuration parameter change requests comprises circuitry coupled to the module to change a run-time variable of the module according to the change request.

13. In an embedded system, a method comprising:
    receiving multiple configuration parameter change requests within a configuration parameter change request transaction;
    determining whether the received configuration parameter change requests within the transaction are in an order capable of sequential execution;
    re-ordering the requests to be in an order capable of sequential execution, if the requests are determined not to be in such an order; and
    executing the configuration parameter change requests in the order to assign change-requested values to run-time variables.

14. The method of claim 13, wherein determining whether the received configuration parameter change requests are capable of sequential execution comprises a configuration manager requesting a servicing module to determine the order of the configuration parameter change requests.

15. The method of claim 14, wherein requesting the servicing module to determine the order further comprises receiving a valid acknowledgement for valid configuration parameter change requests and an out-of-order indication for configuration parameter change requests that are dependent upon updating of a different configuration parameter that has not yet been determined to be in an order of sequential execution.

16. The method of claim 14, wherein requesting the servicing module to determine the order further comprises the configuration manager re-requesting the servicing module to determine the order of a configuration parameter change request that failed on a previous request due to dependency on an out-of-order configuration parameter change request.

17. The method of claim 13, wherein re-ordering the requests further comprises storing in a temporary database the configuration parameter change requests in an order in which they are validated, and at the completion of validating requests, saving the temporary database as a current configuration database.

18. The method of claim 17, wherein executing the requests in the order comprises executing the requests in the order found in the temporary database that is saved as the current configuration database.

19. An article of manufacture comprising a machine-accessible medium having content to provide instructions to cause one or more devices in an embedded system to:
    receive multiple configuration parameter change requests within a configuration parameter change request transaction;
    determine whether the received configuration parameter change request within the transaction are in an order capable of sequential execution;
    re-order the requests to be in an order capable of sequential execution, if the requests are determined not to be in such an order; and
    execute the configuration parameter change requests in the order to assign change requested values to run-time variables.

20. The article of manufacture of claim 19, wherein the content to provide instructions to cause the one or more devices to determine whether the received configuration parameter change requests are capable of sequential execution comprises the content to provide instructions to cause a configuration manager to request a servicing module to determine the order of the configuration parameter change requests.

21. The article of manufacture of claim 20, wherein the content to provide instructions to cause the configuration manager to request the servicing module to determine the order further comprises the content to provide instructions to cause the configuration manager to receive a valid acknowledgement for valid configuration parameter change requests and an out-of-order indication for configuration parameter change requests that are dependent upon updating of a different configuration parameter that has not yet been determined to be in an order of sequential execution.

22. The article of manufacture of claim 20, wherein the content to provide instructions to cause the configuration manager to request the servicing module to determine the order further comprises the content to provide instructions to cause the configuration module to re-request the servicing module to determine the order of a configuration parameter change request that failed on a previous request due to dependency on an out-of-order configuration parameter change request.

23. The article of manufacture of claim 19, wherein the content to provide instructions to cause the one or more embedded devices to re-order the requests further comprises the content to provide instructions to cause the one or more embedded devices to store in a temporary database the configuration parameter change requests in an order in which they are validated, and at the completion of validating requests, save the temporary database as a current configuration database.

24. The article of manufacture of claim 23, wherein the content to provide instructions to cause the one or more embedded devices to execute the requests in the order comprises the content to provide instructions to cause the one or more embedded devices to execute the requests in the order found in the temporary database that is saved as the current configuration database.

25. A system of embedded devices for servicing parameter change requests, comprising:

a configuration servicing node including:

a configuration manager to receive multiple configuration parameter change requests within a configuration parameter change request transaction, to request a determination of whether the received configuration parameter change request within the transaction are in an order capable of sequential execution, and place the requests in an order capable of sequential execution, if the requests are determined not to be in such an order;

a configuration parameter change request servicing module responsive to the configuration manager to effect the determination of whether the configuration parameter change requests are in an order capable of sequential execution, and execute the configuration parameter change requests in the order in which the configuration manager placed them to assign change-requested values to run-time variables; and a transmission line coupled with the configuration servicing node.

26. The system of claim 25, wherein the configuration manager to request a determination and the servicing module to effect the determination further comprises the configuration manager to request the determination from the servicing module, and the servicing module to send a valid acknowledgement for valid configuration parameter change requests and an out-of-order indication for configuration parameter change requests that are dependent upon updating of a different configuration parameter that has not yet been determined to be in an order of sequential execution.

27. The system of claim 25, wherein the configuration manager to request a determination and the servicing module to effect the determination further comprises the configuration manager to request the determination from the servicing module of multiple configuration parameter change requests and to re-request the determination for a configuration parameter change request that failed on a previous determination request due to dependency on a configuration parameter change request that had not yet been determined to be in an order of sequential execution.

28. The system of claim 25, further comprising a temporary configuration database accessible by the servicing node, and wherein the configuration manager to place the requests in an order further comprises the configuration manager to store in the temporary database the configuration parameter change requests in an order of sequential execution determined by the servicing module, and at the completion of the determination requests, save the temporary database as a current configuration database.

* * * * *

UNITED STATES PATENT AND TRADEMARK OFFICE
CERTIFICATE OF CORRECTION

PATENT NO. : 6,901,580 B2
DATED : May 31, 2005
INVENTOR(S) : Iwanojko et al.

It is certified that error appears in the above-identified patent and that said Letters Patent is hereby corrected as shown below:

Column 11,
Line 40, insert -- wherein --, before the first occurrence of "the".
Line 46, insert -- wherein --, before "said".

Signed and Sealed this

Sixteenth Day of August, 2005

JON W. DUDAS
*Director of the United States Patent and Trademark Office*